March 26, 1929. R. F. ANDERSON 1,706,597
WINDSHIELD WEATHER STRIP
Filed Sept. 21, 1925

Inventor
Roy F. Anderson
By Frank E. Liverance, Jr.
Attorney.

Patented Mar. 26, 1929.

1,706,597

UNITED STATES PATENT OFFICE.

ROY F. ANDERSON, OF GRAND RAPIDS, MICHIGAN, ASSIGNOR TO HAYES-IONIA COMPANY, OF GRAND RAPIDS, MICHIGAN, A CORPORATION OF MICHIGAN.

WINDSHIELD WEATHER STRIP.

Application filed September 21, 1925. Serial No. 57,543.

This invention relates to a weather strip for windshields particularly intended for use on automobiles though not necessarily restricted in use to the one field. Windshields in automobiles in many instances are now made of a single piece of glass pivoted to turn on a horizontal axis located near its upper edge, the lower edge of the glass coming against a suitable abutment formed on the lower part of the wind-shield frame. My invention is designed for ready application to this abutment so that the lower edge of the wind-shield is brought against the same making a yielding and close and tight fit which precludes not only the passage of water through between the lower edge of the wind-shield and the wind-shield frame but also the passage of air, such passage of air in many instances being productive of whistling noises not desirable in automobile operation.

The present invention has for one of its objects and purposes the provision of a novel construction of weather strip which is self-corrective of any variations in the shape of the wind-shield or of the abutment which would normally prevent a complete contact of the strip at all points against the edge of the wind-shield. A further object of the invention is to provide a wind-shield weather strip having a double contact surface, each of the members of which is yieldable and to further provide it with a yielding neck portion of reduced thickness which is capable of further ready yielding to provide the desired and necessary complete contact which is required. A still further object of the invention is to construct a wind-shield weather strip of rubber which may be easily formed and molded and which is particularly easy to apply to an automobile. These and various other objects and purposes not stated at the present time will be fully apparent as understanding of the invention is had from the following description taken in connection with the accompanying drawing, in which, Fig. 1 is a fragmentary vertical section showing the wind-shield weather strip applied to the lower member of the wind-shield frame and illustrating the wind-shield at partly open position.

Like reference characters refer to like parts in the different figures of the drawing.

Figure 1:
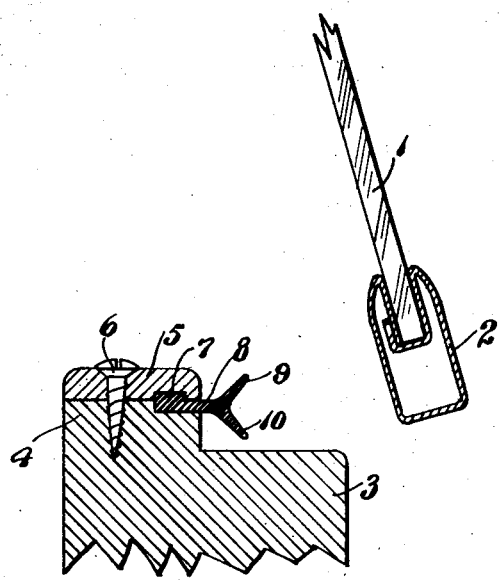

The wind-shield glass is indicated at 1 and in practice is equipped at its lower edge with a border member 2 of sheet metal which moves with the wind-shield in its swinging movements from closed to open position and vice versa. Associated with the wind-shield is a wind-shield frame including a lower member 3 which lies directly above the dash of the motor vehicle. In the construction shown in Figs. 1 and 2 it is formed with an upstanding abutment 4 at its rear inner portion to which a clamping bar 5 may be attached by means of suitable screws 6, the weather strip being clamped between the upper side of the abutment 4 and the bar 5.

Figure 2:
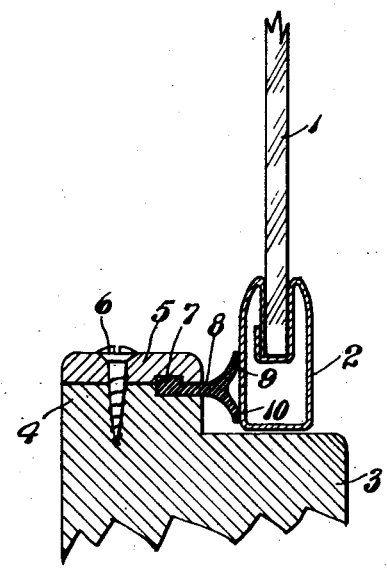
Fig. 2 is a similar view showing the wind-shield in closed position.
Figure 3:
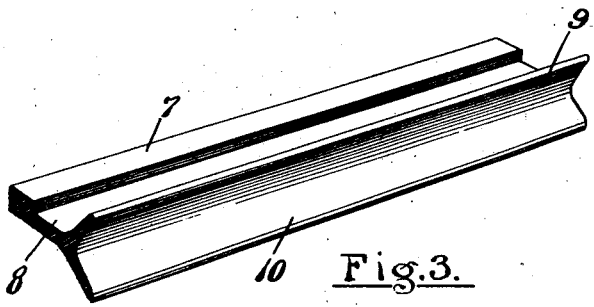
Fig. 3 is a perspective view of a length of the weather strip used in the construction shown in Figs. 1 and 2.

The weather strip construction shown in Figs. 1, 2 and 3 comprises a rear inner section 7 in front of which is a thinner section 8. Said section 8 at its front edge is continued in two wings or flanges 9 and 10, the former extending upwardly and to the front and the latter downwardly and forwardly as shown, the angle between the wings 9 and 10 being substantially a right angle. The front upper portion of the abutment 4 is cut away to make a rabbet in which the rear edge portion of the weather strip may be received while the under side of the bar 5 is formed with a groove corresponding to the upstanding portion of the thicker section 7. When the weather strip is thus applied between the abutment 4 and the clamping bar 5 the wings 9 and 10 are projected in front of the abutment and a portion of the relatively thin section 8 extends in front of the abutment.

When the wind-shield is brought to closed position, as shown in Fig. 2, the rear side of the member 2 bears against the wings or flanges 9 and 10 and if the extreme edges of the same are not in perfect vertical alignment the ready flexibility of the part 8 of the weather strip permits a rocking movement so that they will come into perfect alignment and contact with the rear side of said member 2. The wings or flanges 9 and 10 also being flexible are capable of bending to conform to the surface of the part 2 and a very secure and tight contact will be made. Due to the fact that the flexing of the parts of the weather strip is taken care of at two different points, that is, in the wings or flanges 9 and 10 and in the narrow connecting portion 8, at neither point will the flexing be excessive and the strip accordingly will remain efficient much longer than would be the case if considerable bending and flexing to function properly was required which would result in a breaking of the rubber as it aged and became harder and less responsive to flexing.

Figure 4:
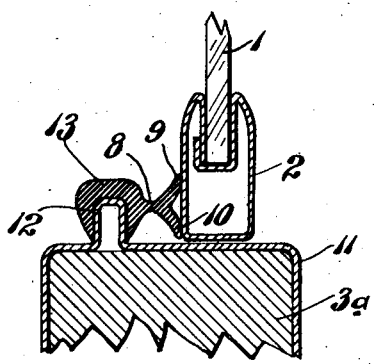
Fig. 4 is a view similar to Fig. 2 illustrating a somewhat different form of the weather strip but serving the same purpose and working on the same principle.

In Fig. 4 a somewhat different form of the construction is shown, the lower windshield frame member 3ᵃ not having any abutment 4 but being covered with a metal covering 11 from which a rib 12 projects upwardly serving the purpose of the abutment. The weather strip instead of being formed with a rear thickened section 7 is formed with an inverted U-shaped section 13 which fits over and clasps against the rib 12. From the front side of the U-shaped portion 13 the relatively thin connecting neck 8 extends forward, it terminating in the wings or flanges 9 and 10 the same as in the construction previously described. The action of the strip is the same in this construction as in that first described, the only difference being in the manner of and the means used to connect the weather strip to the motor vehicle. This construction of weather strip has proved very practical and efficient. The invention is defined in the appended claim and is to be considered as comprehensive of all forms of structure coming within its scope.

I claim:

In combination, an abutment member having a flat surface, a weather strip having a relatively thin flat flexible body located upon said flat surface of the abutment and extending beyond the same, a thickened portion on said flat weather strip body near its rear edge, a retaining strip grooved to receive the thickened portion of the weather strip body and attached to the flat surface of the abutment, and a compressible portion at the extending edge of the flexible weather strip body.

In testimony whereof I affix my signature.

ROY F. ANDERSON.